(12) United States Patent
Tsirline et al.

(10) Patent No.: US 6,848,616 B2
(45) Date of Patent: Feb. 1, 2005

(54) SYSTEM AND METHOD FOR SELECTIVE COMMUNICATION WITH RFID TRANSPONDERS

(75) Inventors: Boris Y. Tsirline, Libertyville, IL (US); Clive P. Hohberger, Highland Park, IL (US); Robert Gawelczyk, Chicago, IL (US)

(73) Assignee: ZIH Corp., a Delaware Corporation with its principal office in Hamilton, Bermuda (BM)

( * ) Notice: Subject to any disclaimer, the term of this patent is extended or adjusted under 35 U.S.C. 154(b) by 0 days.

(21) Appl. No.: 10/249,039

(22) Filed: Mar. 11, 2003

(65) Prior Publication Data

US 2004/0178267 A1 Sep. 16, 2004

(51) Int. Cl.[7] .................................................. G06K 7/08
(52) U.S. Cl. .................... 235/449; 235/432; 235/451; 400/419; 340/522.7
(58) Field of Search ................ 235/449, 432, 235/450, 375, 439, 493, 451; 400/88, 719; 340/572.1, 572.7, 572.8, 572.2; 343/700 MS

(56) References Cited

U.S. PATENT DOCUMENTS

| | | | |
|---|---|---|---|
| 4,509,039 A | | 4/1985 | Dowdle |
| 5,587,578 A | * | 12/1996 | Serra ........................ 235/492 |
| 5,777,586 A | | 7/1998 | Luxon et al. |
| 5,838,253 A | | 11/1998 | Wurz et al. |
| 6,104,291 A | | 8/2000 | Beauvillier et al. |
| 6,150,809 A | * | 11/2000 | Tiernan et al. .............. 324/238 |
| 6,246,326 B1 | * | 6/2001 | Wiklof et al. |
| 6,267,521 B1 | | 7/2001 | Lodwig et al. |
| 6,392,544 B1 | | 5/2002 | Collins et al. |
| 6,409,401 B1 | * | 6/2002 | Petteruti et al. .............. 400/88 |
| 6,512,594 B1 | * | 1/2003 | Lenz et al. ................. 358/1.16 |
| 6,527,356 B1 | * | 3/2003 | Spurr et al. ................... 347/16 |
| 6,565,188 B1 | * | 5/2003 | Saito .......................... 347/33 |
| 6,593,853 B1 | | 7/2003 | Barrett et al. |
| 6,644,544 B1 | * | 11/2003 | Spurr et al. ................. 235/375 |
| 2003/0062131 A1 | * | 4/2003 | Hohberger et al. ......... 156/384 |
| 2003/0063001 A1 | * | 4/2003 | Hohberger et al. ...... 340/572.1 |
| 2003/0067504 A1 | * | 4/2003 | Spurr et al. ................... 347/19 |
| 2004/0061649 A1 | * | 4/2004 | Wielsma .............. 343/700 MS |

FOREIGN PATENT DOCUMENTS

| | | | |
|---|---|---|---|
| JP | 9-139698 A | * | 5/1997 |
| JP | 2002-2026 A | * | 1/2002 |
| JP | 2003-132330 A | * | 5/2003 |

* cited by examiner

Primary Examiner—Jared J. Fureman
(74) Attorney, Agent, or Firm—Babcock IP, LLC

(57) ABSTRACT

A system having an RFID transceiver is adapted to communicate exclusively with a single RFID transponder located in a predetermined confined transponder target area. The system includes a magnetic coupling device comprising a magnetic flux generator responsive to a radio frequency input signal and a magnetic field pattern former. The pattern former is configured to collect flux produced by the flux generator and to form a field pattern in the location of the transponder target area. The system establishes, at predetermined transceiver power levels, a mutual magnetic coupling which is selective exclusively for a single transponder located in the transponder target area.

30 Claims, 7 Drawing Sheets

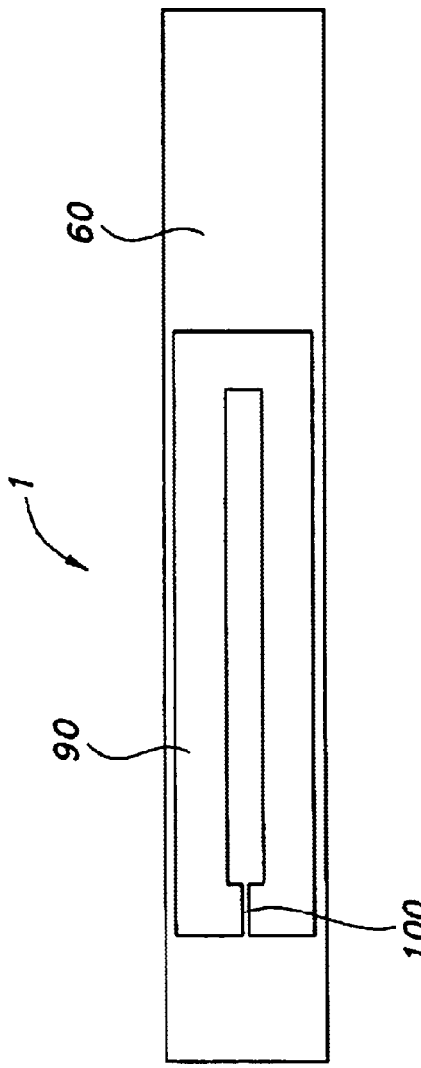
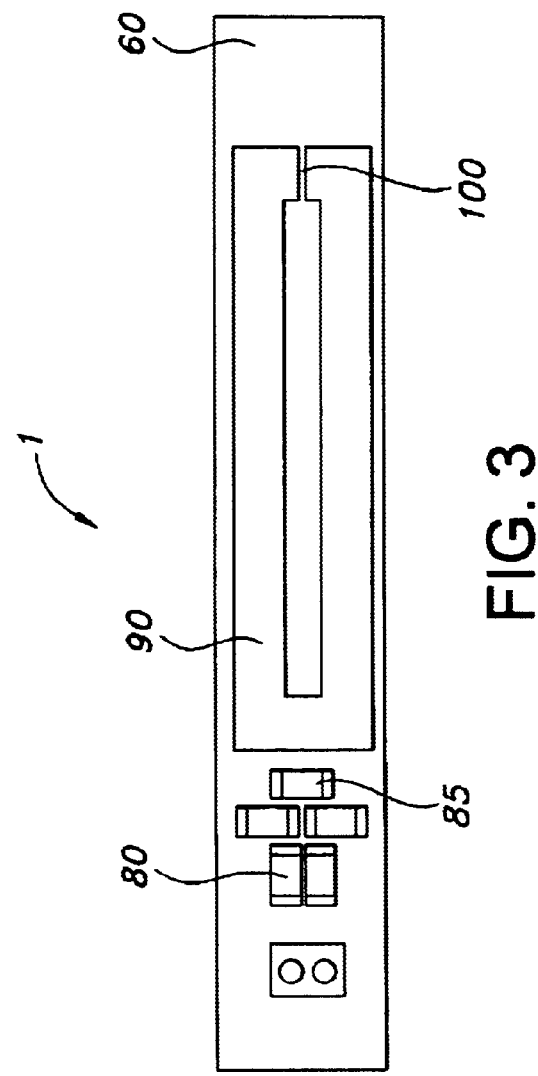

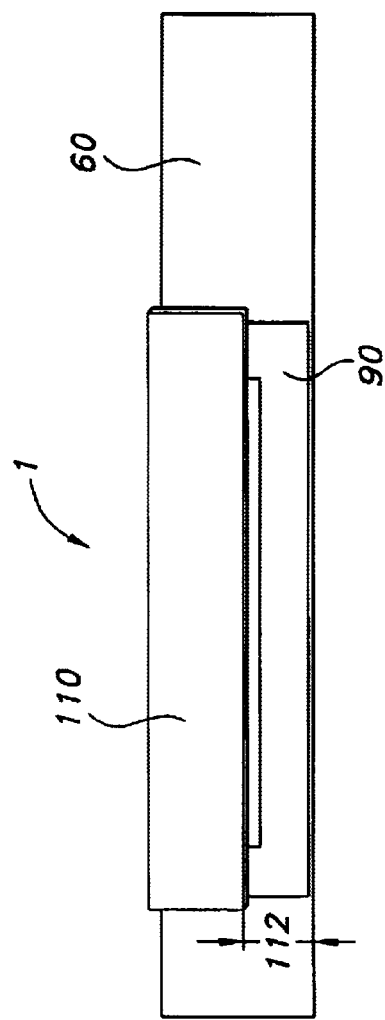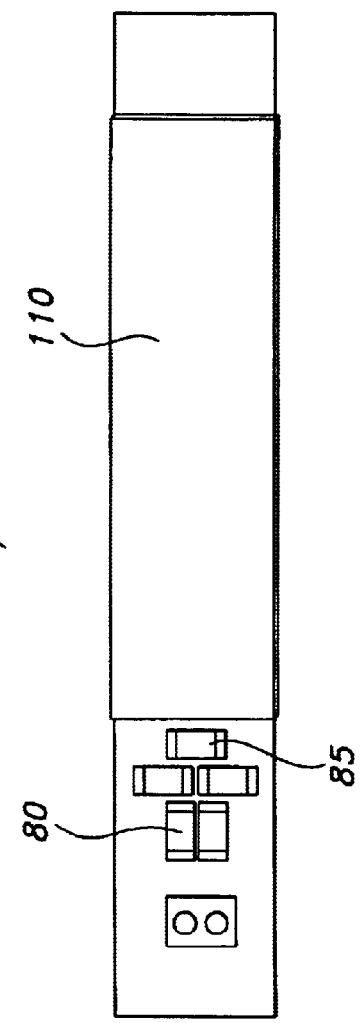

SYSTEM AND METHOD FOR SELECTIVE COMMUNICATION WITH RFID TRANSPONDERS

BACKGROUND OF INVENTION

1. Field of the Invention

The invention relates to RFID communication systems which are selective for an individual transponder located in a predetermined target area, to the exclusion of other transponders, and to printers and other larger systems having such RFID communication systems.

2. Description of Related Art

Inductively coupled radio frequency identification (RFID) technology allows data acquisition and or transmission from and or to active (battery powered) or passive RFID transponders using RF magnetic induction. To read or write from and or to an RFID transponder, the RFID transponder is exposed to an RF magnetic field that couples with and energizes the RFID transponder through magnetic induction and transfers commands and data using a predefined "air interface" RF signaling protocol.

When multiple RFID transponders are within the range of the same RF magnetic field they will each be energized and attempt to communicate with the transceiver, potentially causing errors in reading and or writing to a specific RFID transponder. Anti-collision management technologies exist to allow near simultaneous reading and writing to numerous RFIDs in a common RF magnetic field. However, anti-collision management increases system complexity and cost. Further, anti-collision management is blind. It cannot recognize where a responding transponder is located in the RF magnetic field.

One way to prevent errors during reading and writing to RFID transponders without using anti-collision management is to isolate each RFID transponder from nearby RFID transponders. Previously, isolation of RFID transponders has used RF shielded housings and or anechoic chambers through which the RFID transponders are individually passed for isolated exposure to the interrogating RF magnetic field. This requires that the individual transponders have cumbersome shielding or a significant physical separation.

When RFID transponders are supplied attached to a carrier substrate, for example in RFID-mounted labels, tickets, tags or other media supplied in bulk rolls, Z-folded stacks or other format, an extra portion of the carrier substrate is required to allow one RFID transponder on the carrier substrate to exit the isolated field area before the next RFID transponder in line enters it. The extra carrier substrate increases materials costs and the required volume of the RFID media bulk supply for a given number of RFID transponders. Having increased spacing between RFID transponders may also slow overall throughput.

When the size or form factor of the utilized RFID transponder is changed, the RF shielding and or anechoic chamber configuration may also require reconfiguration, adding cost and complexity and reducing overall productivity.

There exists applications wherein it is desired to print on transponder-mounting media in the same target space in which the transponder is being read from or written to. This may be very difficult to accomplish if the transponder must be interrogated in a shielded housing or chamber.

Printers have been developed which are capable of on-demand printing on labels, tickets, tags, cards or other media with which is associated an RFID transponder. These printers have an RFID transceiver for on-demand communicating with the RFID transponder on the individual media. For the reasons given, it is highly desirable in many applications to present the media on rolls or other format in which the transponders are closely spaced. However, close spacing of the transducers exacerbates the task of serially communicating with each individual transponder without concurrently communicating with transponders on neighboring media. This selective communication exclusively with individual transponders is further exacerbated in printers designed to print on the media in the same space as the transponder is positioned when being interrogated.

Competition in the market for such "integrated" printer-transceiver systems and selective RFID interrogation systems has focused attention on minimization of overall costs, including reduction of the costs of individual RFID transponders, bulk RFID label and or tag supply carrier substrates, printers and or interrogators.

Therefore, it is an object of the invention to provide a system and method which overcomes deficiencies in such prior art.

BRIEF DESCRIPTION OF DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

FIG. 2 is a top view of a magnetic coupling device embodying principles of the present invention.

FIG. 3 is a bottom view of the magnetic coupling device of FIG. 2.

FIG. 4 is a top view of the magnetic coupling device of FIG. 2, with a magnetic field pattern former applied.

FIG. 5 is a bottom view of the magnetic coupling device of FIG. 4.

DETAILED DESCRIPTION

The present invention concerns apparatus and method which enables an RFID transceiver (sometimes termed herein an "interrogator") to communicate selectively and exclusively with a single RFID transponder when one or more other transponders are in close proximity, without the need for physical isolation or cumbersome shielded housings or chambers.

The invention is useful in the loading or reading of transponders, for example on an assembly line, in distribution centers or warehouses where on-demand RFID labeling is required, and in a variety of other applications. In many applications a transponder or a number of transponders are mounted on a label, ticket, tag, card or other media carried on a liner or carrier. It is often desirable to be able to print on the media before, after, or during communication with a transponder. Although this invention is disclosed here in a specific embodiment for use with a direct thermal or thermal transfer printer, it may also be used with any other type of printer using other printing technologies, including inkjet, dot-matrix, and electro-photographic methods.

In some applications a print station may be at a distance from the RFID transceiver; in others it may be necessary to accomplish the print function in the same general space occupied by the transponder when it is being interrogated (sometimes herein termed the "transponder target area").

Figure 1:
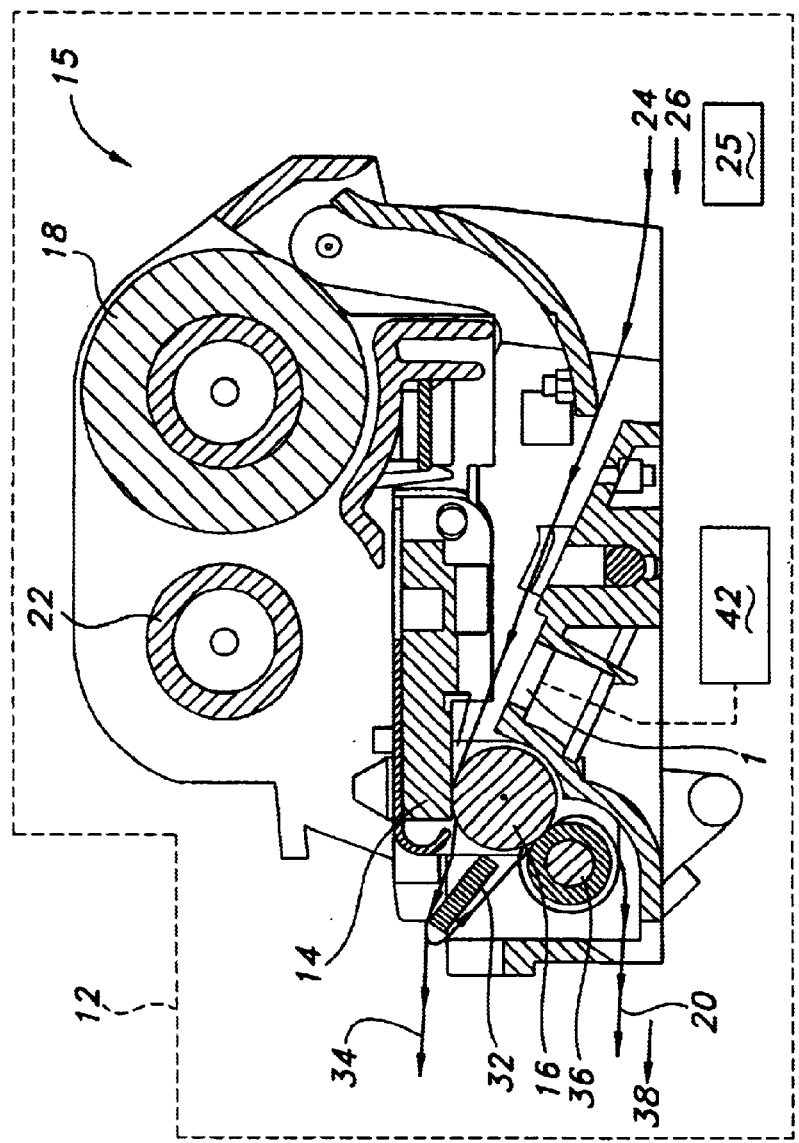
FIG. 1 is a side schematic view of a media printer according to one embodiment of the invention having an improved RFID interrogation system.

FIG. 1 illustrates by way of example only an implementation of the invention in a thermal transfer label printer 12 in which both printing and transponder communication are accomplished, but at different locations in the printer.

As shown in FIG. 1, the printer 12 includes a printhead sub-assembly 15 comprising a conventional thermal printhead 14 and platen roller 16, as in a direct thermal printer for printing on thermally-sensitive media. A web 24 of media, such as labels, tickets, tags or cards, is directed along a feed path 26 to the printhead 14 where the printhead 14 applies on demand text and/or graphics under control of a computer or microprocessor (not shown). After being printed, the media may be peeled off the underlying carrier substrate 20 at a tear bar 32 and follows a media exit path 34. The liner or carrier substrate 20 for the media is guided out of the printer 12 by a roller 36 where it exits the printer along an exit path 38.

When a thermal printer is configured for use as a thermal transfer printer, a ribbon supply roll 18 delivers a thermal transfer ribbon (not shown for clarity) between printhead 14 and the media on web 24. After use, the spent ribbon is collected on a take-up reel 22.

In accordance with an aspect of the present invention, the printer includes a transceiver 42 and a magnetic coupling device 1 located proximate the media feed path 26. As will be explained and illustrated in detail hereinafter, the system (including transceiver 42 and magnetic coupling device 1) forms a magnetic flux field pattern in the location of a transponder target area 44 (see FIG. 6A). The system is configured to establish at predetermined transceiver power levels a mutual magnetic coupling which is selective exclusively for a single transponder located in the transponder target area 44.

As labels or other media with embedded transponders move along the media feed path 26, through target area 44, data may be read from and or written to transponder 10. Information indicia then may be printed upon an external surface of the media as the media passes between the platen roller 16 and the printhead 14 by selective excitation of the heating elements in the printhead 14, as is well known in the art. When the thermal printer 12 is configured as a direct thermal printer, the heating elements form image dots by thermochromic color change in the heat sensitive media; when the thermal printer 12 is configured as a thermal transfer printer, then ink dots are formed by melting ink from the thermal transfer ribbon (not shown for clarity) delivered between printhead 14 and the media on web 24 from supply roll 18. Patters of printed dots thus form the desired information indicia on the media, such as text, barcodes or graphics.

Media conveyance is well known in the art. Therefore the media conveyance 25 portion of the printer that drives the media with transponders along the media feed path 26 is not described in detail.

The magnetic coupling device 1 and its manner of operation will now be described with reference to FIGS. 2–7. One embodiment of the magnetic coupling device 1 is configured for use, for example, with 13.56 MHz RFID transponders 10. Transponders 10 are bulk supplied on a carrier substrate 20 in label, ticket, card or tag form with a printable facestock 30.

The magnetic coupling device 1 comprises a magnetic flux generator and a magnetic field pattern former, as will be described. The magnetic flux generator may comprise one or more coils responsive to RF signals supplied by the transceiver 42. The coils may take the form of a planar elongated coil created, for example, by conductor(s) coupled with a coil support structure. The conductors and coil support structure may comprise, for example, a coil trace(s) 50 on and or within a multi-layered printed circuit board (PCB) 60. Coil trace(s) 50 may be formed without sharp corners to minimize creation of impedance discontinuities.

Because the wavelength at 13.56 MHz is approximately 22 meters, design of a small, low-cost antenna for coupling to an RFID transponder using electromagnetic radiation is difficult. Therefore, the magnetic coupling device 1 is configured to mutually couple to RFID transponder(s) operating at frequencies with long wavelengths using only magnetic induction coupling. As will be described hereinafter, electric fields emitted by coil trace 50 are suppressed by a grounded E-field suppressor shield 90.

The dimensions of the magnetic coupling device 1 and the number of turns, for example three to five turns, used in the coil(s) are determined in part by the intended range from and longitudinal dimensions of the RFID transponder 10 which the magnetic field of the magnetic coupling device will selectively mutually inductively couple with. Capacitors 80, for example surface mounted to the PCB 60 local to the coils trace(s) 50, may be used for impedance matching (for example, 50 ohm) and tuning of the magnetic coupling device 1, to zero the imaginary component of impedance at a desired resonant frequency. Other impedance matching and or magnetic coupling device tuning components that may be applied include matching transformers, inductors and a tap of the magnetic coupling device coil. one or more resistor(s) 85 may be used to adjust a Q-factor of the magnetic coupling device The E-field suppressor shield 90 may be created, for example, by forming another conductive layer on one or both sides of the PCB 60 containing coil trace 50, as shown in FIGS. 2, 3, 4 and 6A and 6B. The E-field suppressor shield 90 may be formed as a gapped loop that covers the magnetic coupling device radiating coil trace(s) 50 completely with the exception of a small open circuit 100, as shown in FIGS. 1 and 2. The purpose of the open circuit 100 is to prevent Eddy current flow in the E-field suppressor shield 90 which would cause signal losses.

Without more, the coil trace(s) of the magnetic coupling device 1 may be expected to emit magnetic flux lines in a generally omnidirectional toroid pattern about the coil trace(s) 50. A transponder-selective magnetic field pattern former 110 is provided to collect flux produced by the flux generator (coil trace(s) 50 in the illustrated embodiment) and to form a field pattern 70 in the location of a predetermined transponder target area 44.

Figure 6A:
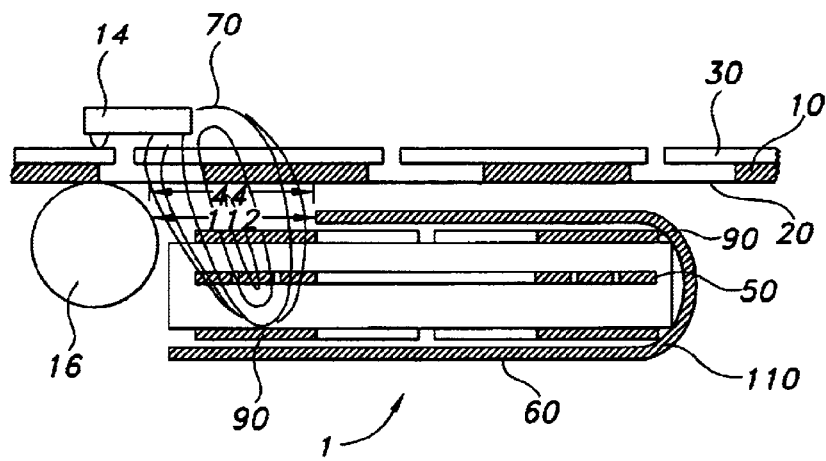
FIG. 6A is a cut-away side view of a magnetic coupling device as shown in FIGS. 4 and 5, illustrating schematically a mutual magnetic coupling selectively with a single RFID transponder supplied in-line with other RFID transponders on a carrier substrate.

FIG. 6A illustrates an arrangement wherein a transceiver 42 and magnetic coupling device 1 are located in a printer having a printhead 14 and associated platen roller 16 which are located proximate the transponder target area 44. With the printhead 14 within or near the transponder target area 44, a label or other media carrying a transponder can be interrogated (read and or write) and the carrying media can be printed in essentially the same space. This is important in on demand systems, particularly portable or compact systems, where it would be impractical to have a print station located remotely from the transponder interrogation station.

Figure 7:
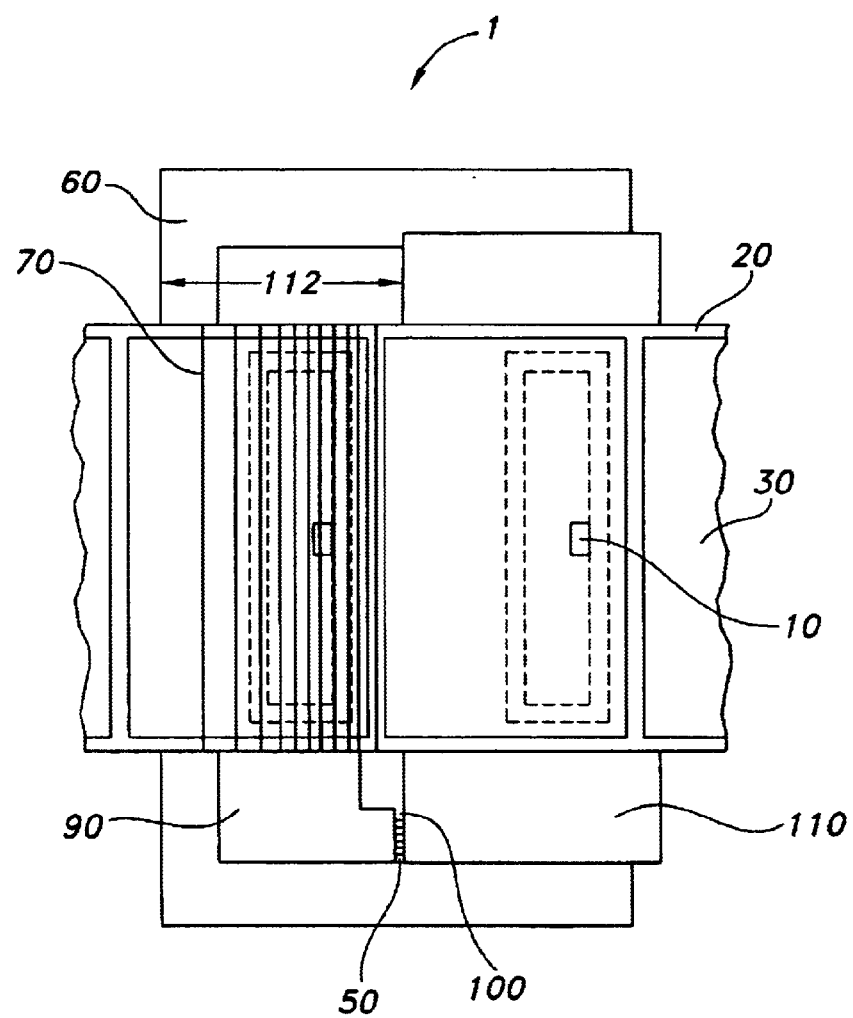
FIG. 7 is a partial cut-away top schematic view of the magnetic coupling device and carrier substrate mounted RFID transponders of FIG. 6A; a printhead and platen roller have been omitted for clarity.

The field pattern former 110 increases the amount of magnetic flux by inserting into the field space a material of higher magnetic flux permeability than free space. The field pattern former 110 has a gap 112 within and adjacent to which the field pattern is formed. The gap 112 is defined as areas of the magnetic coupling device 1, and in the present embodiment particularly coverage of the coil trace 50, which are not covered by the field pattern former 110. The resulting field pattern is therefore positioned and influenced by the configuration and position of the gap 112. In the FIG. 6A embodiment, the gap 112 may be, for example, approximately the width of one side of the coil traces 50 or may be about 50% of the top surface area of the PCB 60 (if the coil trace 50 is centered on the PCB 60) and is located at the end of the magnetic coupling device 1 nearest the printhead 14. Configurations that cover more or less of the coil traces 50 and or, for example, all edges of the PCB 50 are also usable to create a magnetic field pattern 70 that matches a desired transponder target area 44. A top view of the arrangement shown in FIG. 6A is illustrated in FIG. 7.

Alternatively, a simplified RFID transponder read and or write system may be formed without printing capabilities by positioning a magnetic coupling device 1 coupled to a transceiver 42 proximate a media conveyance moving sequential RFID transponders through a target area 44 of the magnetic coupling device 1.

Figure 6B:
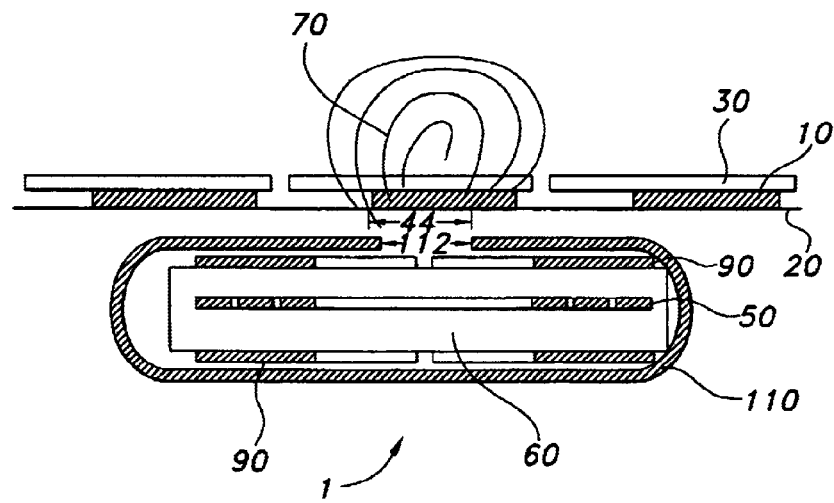
FIG. 6B is a view similar to FIG. 6A of an alternative embodiment of an aspect of the invention.

Such an alternative embodiment is shown in FIG. 6B wherein the gap 112 in coverage by a field pattern former 110 is disposed intermediate the ends of magnetic coupling device 1. The FIG. 6B embodiment is configured for applications wherein an associated printing function in the same physical space is not necessary. The FIG. 6B embodiment contemplates that any printing or other function to be performed is accomplished at another station. The printer 12 illustrated in FIG. 1 and described above is an example of an execution of the invention wherein the interrogation of the transponders is accomplished at a distance from the printhead 14.

The field pattern former 110 may be formed using a material preferably having a magnetic relative permeability of 20 or more. The material may be, for example, a ferrite composition. Ferrite is a general name for a class of materials having a powdered, compressed, and sintered magnetic material having high resistivity, consisting chiefly of ferric oxide combined with one or more other metals. The high resistance of ferrite compositions makes eddy-current losses extremely low at high frequencies. Examples of ferrite compositions include nickel ferrite, nickel-cobalt ferrite, manganese-magnesium ferrite and yttrium-ion garnet. The field pattern former 110 may be a rubberized flexible ferrite, ferrite polymer film or stennite material. Flex Suppressor (trademark) material available from Tokin EMC is also a suitable material. The selected field pattern former 110 may be connected to the PCB 60, for example, with an adhesive. Alternatively, the field pattern former 110 may be applied in a liquid or semi liquid form, upon the desired areas of the PCB 60 or other coil support structure and solidified and or cured to leave, for example, only a desired gap 112 uncovered by the material comprising the field pattern former 110.

The embodiment shown in FIGS. 4–7 may have a field pattern former 110 of flexible ferrite. For example, for the embodiment shown in FIGS. 4,5,6A and 7, the field pattern former 110 covers the magnetic coupling device 1 area of the bottom side of the PCB 60 and extends, wrapped about the PCB 60 in a single portion to cover approximately one half of the top side of the coil traces 50, resulting in the concentration of flux and the formation of a magnetic field pattern 70 within and adjacent the gap 112.

In accordance with an aspect of the present invention, the system is configured to establish at predetermined transceiver power levels a mutual magnetic coupling which is selective exclusively for a single transponder located in the predetermined transponder target area 44. As will become evident from the description of FIGS. 8A and 8B, the mutual coupling will vary depending upon the mechanical and electrical characteristics of the coupled transponder, the applied power levels of the transceiver 42, the size and other properties of any media 20 which supports the transponder, the characteristics of the pattern former, and other factors.

Obviously, at some exaggerated transceiver power level transponders outside the transponder target area 44 may be excited. However, by this invention, at power levels in the range of normal transceiver operations, and, for example, allowing for a 3 dB or greater tolerance margin, the mutual coupling created will be highly selective for the transponder 10 in the transponder target area 44.

The compact size of the magnetic coupling device 1 and the lack of any other shielding requirements allows the economical addition of sequentially spaced multiple RFID transponder format read and or write capability to a range of sequential RFID transponder transport devices, for example label printers, to form a selective transponder communication module.

Because the magnetic coupling device 1 may be configured to be selective exclusively for a single transponder located in the transponder target area 44, it is now possible by this invention to use a web of media having transponders which are closely spaced on the web, as shown in the figures of this application. Prior to this invention it was extremely difficult to communicate with just one transponder in a closely spaced series of transponders without simultaneously activating adjacent transponders.

Figure 8A:
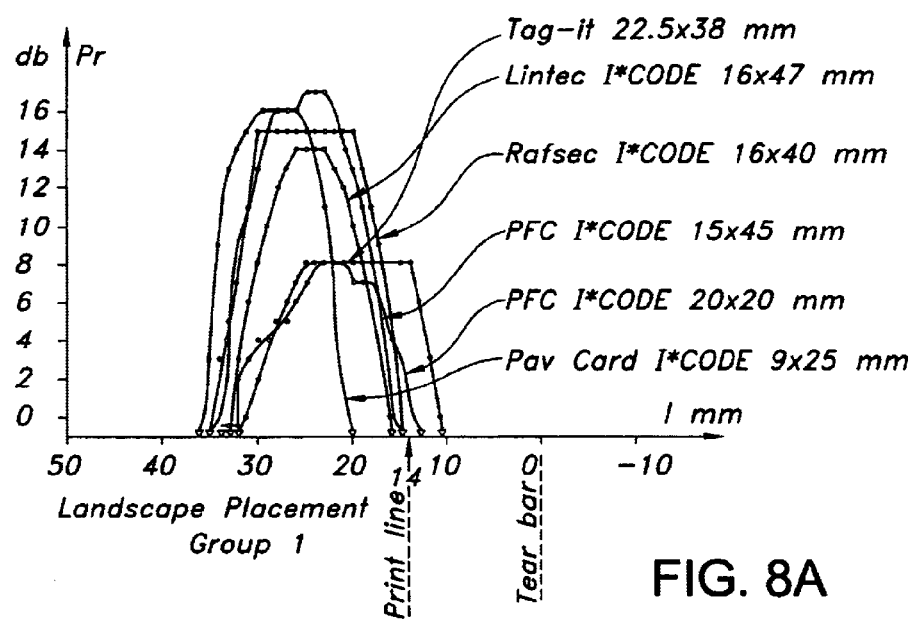
FIG. 8A is a test chart showing relative power levels delivered for activation by a magnetic coupling device of the invention of several different types of RFID transponders, in "landscape" orientation, as a function of location of the transponder along a feed path of a hypothetical media printer.
Figure 8B:
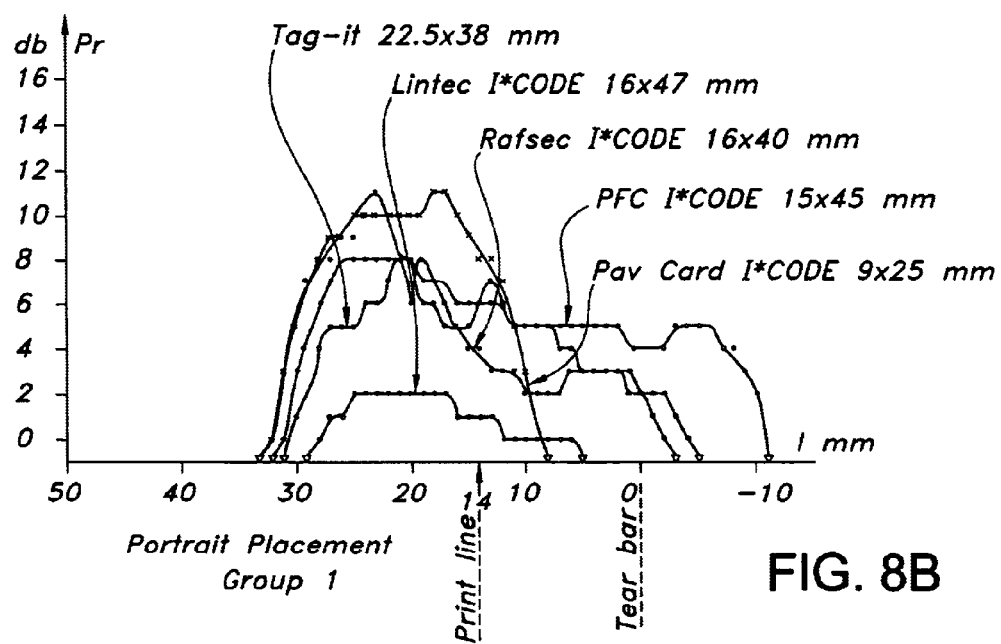
FIG. 8B is a test chart similar to that of FIG. 8A but with the transponders in a "portrait" orientation.

FIGS. 8A and 8B are test charts showing relative power levels delivered for activation by a magnetic coupling device according to the invention of several different types of rectangular transponders as a function of location along the feed path 26 of printer 12, and the orientation of these transponders along the web 24. FIG. 8A shows data for selected transponders in the "landscape" orientation similar to FIG. 7. FIG. 8B shows data for selected transponders in the "portrait" orientation, in which the long axis of the transponder is along feed path 26. The FIGS. 8A and 8B charts reveal how highly sensitive the system of the invention is for a transponder located in the transponder target area 44, and how highly non-sensitive the system is for any transponder outside the target area 44.

The different curves in the FIGS. 8A and 8B charts are associated with different commercially available 13.56 MHz RFID transponders, as labeled. Here, the RFID integrated types, antenna geometries and/or manufacturers of the selected transponders are not in themselves important, as they are used only as examples to demonstrate the effect of the invention. The curves themselves reflect how the mutual coupling with the various selected transponders results in different position sensitivity to excitation within the transponder target area 44.

The different curves shown in the charts of FIGS. 8A and 8B are not magnetic field distributions, but rather estimates of the available power margin over the reading threshold for each type of transponder as a function of orientation and position relative the target area 44. This measurement is made by applying a constant-power RF signal to the magnetic coupling device 1 through a variable RF attenuator; then increasing the attenuation in decibels until the reading of data from transponder 10 stops; and finally recording the attenuation value as a function of position and orientation on the appropriate chart in FIG. 8A or 8B. These charts are used to select an optimal location within the labels, tickets, tags or cards for embedding the transponders, and determine the minimum allowable spacing between transponders along the web 24.

To better understand the FIGS. 8A and 8B charts, an explanation with respect to one of the curves, identified as describing the characteristics of a "Lintec I*CODE 16×47 mm " RFID transponder, will be made in detail. In the example shown in FIG. 8A, the curve begins at a first position where the front edge of the coil of the transponder 10 is located in the target area target area 44 at a distance of 16 mm from a reference "0" line defined by the sharp corner edge of the tear bar 32. At this point, the leading edge of the transponder 10 antenna coil is also located 2 mm back of a second reference line labeled "print line" of printhead 14. The print line is analogous to the print line in FIG. 6A where the printhead 14 engages a media to be printed. The Lintec I*CODE 16×47 mm transponder curve shows that, at the designated transceiver test power level, the transponder cannot be activated.

In this printer configuration, moving the transponder back only 2 mm to a position 18 mm from the reference "0" line and 4 mm behind the "print line", the transponder is responsive until the test transceiver power level is suppressed 6 dB. If the transponder is moved back another 4 mm, to a position 8 mm behind the "print line" the transceiver test power level must be attenuated a full 13 dB before the transponder will not respond normally.

The back side of the Lintec I*CODE 1 6×47 mm curve is equally steep. With the transponder moved back only 14 mm from the print line; the transponder responds normally with the test transceiver power level suppressed up to 12 dB. However, with the transponder moved back just 20 mm from the print line, the transponder will not respond to the transceiver delivering the test power level.

The transponder is 16 mm wide and 47 mm long. In a landscape orientation with respect to the direction of media travel, as soon as the leading edge of the transponder coil clears either side of a roughly 17 mm target area, it is unable to be activated. The other curves demonstrate responses of a range of different RFIDs using the same test configuration. Allowing for the possible use of all the different transponders with the same magnetic coupling device configuration provides a usable target area of 25 mm or less. With this degree of selectivity provided by the present invention, transceiver power levels can be raised to provide a comfortable safety margin without concern for energizing adjacent transponders even when the transponders are closely spaced. Conversely, the target area is wide enough that pinpoint positioning of the transducer is not necessary for reliable communication.

Results in the portrait orientation shown in FIG. 8B are less closely defined. When the longer dimension of the RFID transponder is along the feed path 26, the magnetic coupling device 1 may inductively couple along any portion of the extended length of RFID transponder 10, even if a majority of the transponder area is outside the target area 44.

Figure 9:
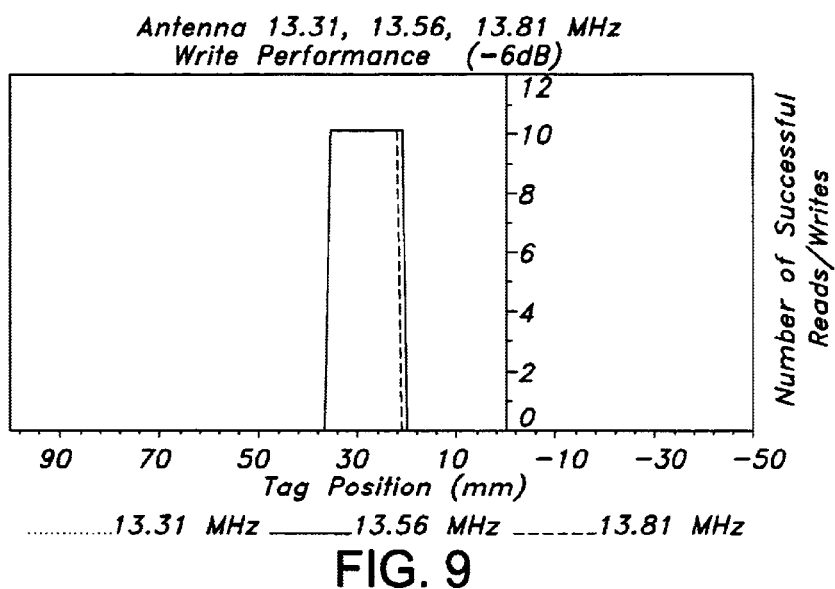
FIG. 9 is a test chart showing successful RFID transponder writes with respect to the position of an RFID transponder along a feed path of a label printer containing a magnetic coupling device according to one embodiment of the invention having a constant magnetic coupling device power level.

Another way to measure the system performance is shown in FIG. 9. FIG. 9 is a test chart demonstrating the number of successful write operations out of ten attempts as a typical Phillips I*Code (trademark) 13.56 MHz RFID transponder with a 12×38 mm antenna coil is moved across the print media path of a Zebra Technologies, Inc. model R402 label printer/RFID programmer, equipped with a magnetic coupling device 1 according to the present invention. The RFID transponder location for each test series is shown relative to either side of the printer's tear bar (representing "0" on the tag position axis), along the print media path. Results of three different test series taken with 13.56 MHz RF excitation and the magnetic coupling device 1 resonant at frequencies 13.31, 13.56, and 13.81 MHz respectively are shown for each location at 1 mm increments. FIG. 9 demonstrates that the focused magnetic field pattern 70 generated by the present invention may be configured to cause successful inductive coupling with an RFID transponder only within a very closely defined target area, permitting the RFID transponders to be closely sequentially spaced together without causing read and or write collisions through accidental activation of multiple transponders.

Figure 10:
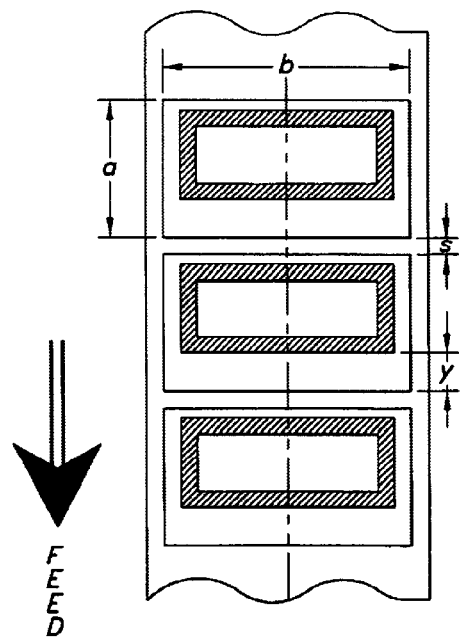
FIG. 10 is a chart showing a range of acceptable RFID transponder locations and substrate dimensions for use with a magnetic coupling device according to one embodiment of the invention.

FIG. 10 shows an RFID transponder placement map, also for I*Code 12×38 mm RFID transponders, derived from testing on the model R402 similar to that shown in FIGS. 8 and 9 for a plurality of different transponder locations. Labels having a width "a" of at least 21 mm; a length "b" of between 29 and 102 mm; a lead edge distance "y" of between 8 and 22 mm; and a label spacing "s" of a minimum of 1 mm are possible. From this form of testing, specific to each RFID transponder, a minimum periodicity "P" for a specific RFID transponder may be calculated as P=a+s. The value of "P" then becomes the same as the minimum RFID transponder spacing, leading edge to leading edge (as well as the minimum label repeat distance along the web) required to ensure that read and or write collisions do not occur for the selected RFID transponder and magnetic coupling device 1 combination.

The magnetic field pattern former 110 may be easily adjusted for different desired magnetic field directions and or shapes during manufacture by varying the size, configuration and or location of the magnetic field pattern former 110 applied to the PCB 60 or other coil support structure.

| Table of Parts | |
|---|---|
| 1 | magnetic coupling device |
| 10 | transponder |
| 12 | printer |
| 14 | printhead |
| 15 | printhead sub-assembly |
| 16 | platen roller |
| 18 | supply roll |
| 20 | carrier substrate |
| 22 | take up reel |
| 24 | web |
| 25 | media conveyance |
| 26 | feed path |
| 30 | facestock |
| 32 | tear bar |
| 34 | label exit path |
| 36 | roller |
| 38 | carrier exit path |
| 42 | transceiver |
| 44 | target area |
| 50 | coil trace |
| 60 | printed circuit board |
| 70 | field pattern |
| 80 | capacitors |
| 85 | resistor |
| 90 | E-field suppressor shield |
| 100 | open circuit |
| 110 | field pattern former |
| 112 | gap |

Where in the foregoing description reference has been made to ratios, integers or components having known equivalents then such equivalents are herein incorporated as if individually set forth.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus, methods, and illustrative examples shown and described. Accordingly, departures may be made from such details without departure from the spirit or scope of applicant's general inventive concept. Further, it is to be appreciated that improvements and/or modifications may be made thereto without departing from the scope or spirit of the present invention as defined by the following claims.

What is claimed is:

1. A printer including a transceiver adapted to communicate with RFID transponders, comprising:
    a printhead;
    a media conveyance adapted to transport a series of discrete media to said printhead and through a transponder target area, at least some of said media including an RFID transponder;
    a magnetic flux generator having a planar coil formed as a trace upon a first layer of a printed circuit board responsive to a radio frequency input signal; and
    a magnetic field pattern former configured to collect flux produced by said magnetic flux generator and to form a field pattern in the location of said transponder target area, said transceiver being configured to establish at predetermined power levels a mutual magnetic coupling which is selective exclusively for a single transponder located in said transponder target area.

2. The printer defined by claim 1 wherein said magnetic field pattern former comprises a ferrite structure arranged to partially surround said coil and having a gap within and adjacent to which said field pattern is formed.

3. The printer defined by claim 1 wherein said magnetic field pattern former comprises a ferrite structure.

4. The printer defined by claim 1 wherein said printhead is positioned and configured to print on or adjacent said transponder while it is still in said target area.

5. The printer defined by claim 1 wherein said printhead is positioned and configured to print on or adjacent said transponder when it is outside of said target area.

6. The printer defined by claim 1 adapted to feed a web of spaced transponders through said target area, and wherein said printer communicates with a transponder located in said target area but concurrently not with another transponder located outside of said target area.

7. The printer defined by claim 1 wherein said magnetic field pattern former comprises a ferrite structure arranged to partially surround said flux generator and having a gap within and adjacent to which said field pattern is formed.

8. The printer defined by claim 7 wherein said gap is located at an end of said pattern former adjacent the printhead, and wherein said printhead is positioned and configured to print on or adjacent said transponder while it is in said target area.

9. The printer defined by claim 7 wherein said gap is located intermediate opposed ends of said pattern former, and wherein said printhead is positioned and configured to print on or adjacent said transponder when it is outside of said target area.

10. The printer defined by claim 1 including an electric field suppressor located coplanar with the coil between said magnetic flux generator and said target area.

11. The printer defined by claim 10 wherein said suppressor comprises a metal shield formed as a second layer of the printed circuit board covering the planar coil except for an open circuit adapted to suppress eddy currents.

12. The printer defined by claim 1 wherein said magnetic field pattern former has a relative permeability greater than 20.

13. A system comprising an RFID transceiver and adapted to communicate exclusively with a single RFID transponder located in a predetermined confined transponder target area, said system comprising:
    a magnetic flux generator responsive to a radio frequency input signal;
    a magnetic field pattern former configured to collect flux produced by said flux generator and to form a field pattern in the location of said transponder target area; and
    an electric field suppressor located between said magnetic flux generator and said target area; said system being configured to establish at predetermined transceiver power levels a mutual magnetic coupling which is selective exclusively for a single transponder located in said transponder target area.

14. The system defined by claim 13, wherein said flux generator comprises a coil receiving said input signal.

15. The system defined by claim 14 wherein said magnetic field pattern former comprises a ferrite structure arranged to partially surround said coil and having a gap with and adjacent to which said field pattern is formed.

16. The system defined by claim 13 wherein said magnetic field pattern former comprises a ferrite structure.

17. The system defined by claim 13 wherein said system comprises a printer and includes a printhead.

18. The system defined by claim 17 wherein said printhead is positioned and configured to print on or adjacent said transponder while it is still in said target area.

19. The system defined by claim 17 wherein said printhead is positioned and configured to print on or adjacent said transponder when it is outside of said target area.

20. The system defined by claim 13 adapted to feed a web of spaced transponders through said target area, and wherein said system communicates with a transponder located in said target area but concurrently not with another transponder located outside of said target area.

21. The system defined by claim 20 wherein said target area is not significantly greater than a periodicity "P".

22. The system defined by claim 13 wherein said target area is not significantly greater than the width of an individual transponder.

23. The system defined by claim 13 which includes a printhead and wherein said magnetic field pattern former comprises a ferrite structure arranged to partially surround said flux generator and having a gap within and adjacent to which said field pattern is formed.

24. The system defined by claim 23 wherein said gap is located at an end of said pattern former adjacent the printhead, and wherein said printhead is positioned and configured to print on or adjacent said transponder while it is in said target area.

25. The system defined by claim 23 wherein said gap is located intermediate opposed ends of said pattern former, and wherein said printhead is positioned and configured to print on or adjacent said transponder when it is outside of said target area.

26. The system defined by claim 13 including a media conveyance configured to transport a web of labels of periodicity "P" through said target area, at least some of which labels have an RFID transponder, wherein said system includes a printhead for printing on said labels, wherein said magnetic flux generator comprises a colt, and wherein said magnetic field pattern former comprises a ferrite structure arranged to partially surround said coil and having a gap within and adjacent to which said field pattern is formed.

27. The system defined by claim 26 wherein said target area is not significantly greater than "P".

28. The system defined by claim 26 wherein said target area is not significantly greater than the width of an individual transponder.

29. The system defined by claim 13 wherein said magnetic flux generator comprises a planar coil, and wherein said suppressor comprises a metal shield coplanar with and covering said coil; said metal shield having an open circuit adapted to suppress an electrical component of an RF wave.

30. The system defined by claim 13 wherein said magnetic field pattern former has a relative permeability greater than 20.

* * * * *